US006984807B2

(12) United States Patent
Richlen

(10) Patent No.: US 6,984,807 B2
(45) Date of Patent: Jan. 10, 2006

(54) HEATED MOTORCYCLE HANDGRIPS

(75) Inventor: Jeffrey E. Richlen, Oak Creek, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 16 days.

(21) Appl. No.: 10/615,814

(22) Filed: Jul. 9, 2003

(65) Prior Publication Data

US 2004/0011777 A1 Jan. 22, 2004

Related U.S. Application Data

(60) Provisional application No. 60/395,575, filed on Jul. 12, 2002.

(51) Int. Cl.
*B60L 1/02* (2006.01)

(52) U.S. Cl. ...................... 219/204; 219/202; 219/494; 219/544; 219/201; 74/551.8; 74/761

(58) Field of Classification Search ................ 219/202, 219/204, 530, 494, 481, 540, 544, 201; 73/761, 73/551.8; 180/219; 165/40; 74/761, 551.8
See application file for complete search history.

(56) References Cited

U.S. PATENT DOCUMENTS

| | | | | | |
|---|---|---|---|---|---|
| 744,739 | A | * | 11/1903 | Fliess | 219/201 |
| 3,667,315 | A | * | 6/1972 | Polly, Sr. | 74/551.8 |
| 4,181,190 | A | * | 1/1980 | Yang | 180/219 |
| 4,471,209 | A | * | 9/1984 | Hollander | 219/204 |
| 4,990,753 | A | * | 2/1991 | Hollander | 219/505 |
| 5,613,407 | A | | 3/1997 | Ogata | |
| 5,735,037 | A | | 4/1998 | Ogata | |
| 5,931,750 | A | * | 8/1999 | MacKay, Jr. | 473/566 |
| 6,114,668 | A | | 9/2000 | Ogata et al. | |
| 6,268,588 | B1 | | 7/2001 | Hazebrouck et al. | |
| 2003/0226836 | A1 | * | 12/2003 | Miura et al. | 219/204 |
| 2004/0007567 | A1 | * | 1/2004 | Downey et al. | 219/494 |

FOREIGN PATENT DOCUMENTS

| | | | |
|---|---|---|---|
| DE | 29919346 | * | 1/2000 |
| JP | 02003080925 | * | 3/2003 |

* cited by examiner

*Primary Examiner*—Tu Ba Hoang
*Assistant Examiner*—Leonid M. Fastovsky
(74) *Attorney, Agent, or Firm*—Michael Best & Friedrich LLP

(57) ABSTRACT

A heated motorcycle handgrip is securable to a motorcycle handlebar and includes a grip housing that has a first end adapted to receive the handlebar, and a second end opposite the first end. The grip housing includes a heating element that is operable to provide a heat output, and a heater control dial is coupled to the second end of the handgrip to control the heat output of the heating element.

16 Claims, 5 Drawing Sheets

119
30
212
60
115
124
134
132
52
130
120
136
138
142
34
114
112
143
113
154
137
64
116
168
158
165
162
110
73
68
90
94
98
100
102
86
82
76
72
36

HEATED MOTORCYCLE HANDGRIPS

CROSS-REFERENCE TO RELATED APPLICATIONS

This application claims priority to U.S. Provisional Application No. 60/395,575, filed Jul. 12, 2002, the entire contents of which is hereby incorporated by reference.

FIELD OF THE INVENTION

The invention relates to vehicle controls, and more particularly to heated motorcycle handgrips.

BACKGROUND

Providing heated handlebar grips for motorcycles and similar vehicles is known. Heated grips provide additional warmth and comfort for the hands of a motorcycle operator when the heated grips are activated. Prior heated grips utilize various control devices that allow the operator to adjust the relative amount of additional heat provided by the handgrips. Generally, the control switches or dials used to adjust the heat level of the handgrips are mounted near the instrument panel of the motorcycle, or at another location remotely located from the handgrip itself. Such location of the heat adjusting controls requires the motorcycle operator to remove one of his hands from the handgrip in order to adjust the amount of heat provided by the handgrip.

SUMMARY OF THE INVENTION

The present invention is directed to a heated motorcycle handgrip including a grip housing that has a first end adapted to receive the handlebar, and a second end opposite the first end. The grip housing includes a heating element, and a heater control dial is coupled to the second end of the handgrip to control the heat output of the heating element. In one aspect of the invention, the control dial includes a diameter that is smaller than the diameter of the grip housing. In another aspect of the invention, the control dial includes a rib to enhance engagement of the grip by the user.

In another aspect of the invention, the left and right grips are connected by a wire. The wire is positioned inside the handlebars to provide protection to the wire and to provide an aesthetically pleasing appearance.

Other features and advantages of the invention will become apparent to those skilled in the art upon review of the following detailed description, claims, and drawings.

Figure 1:
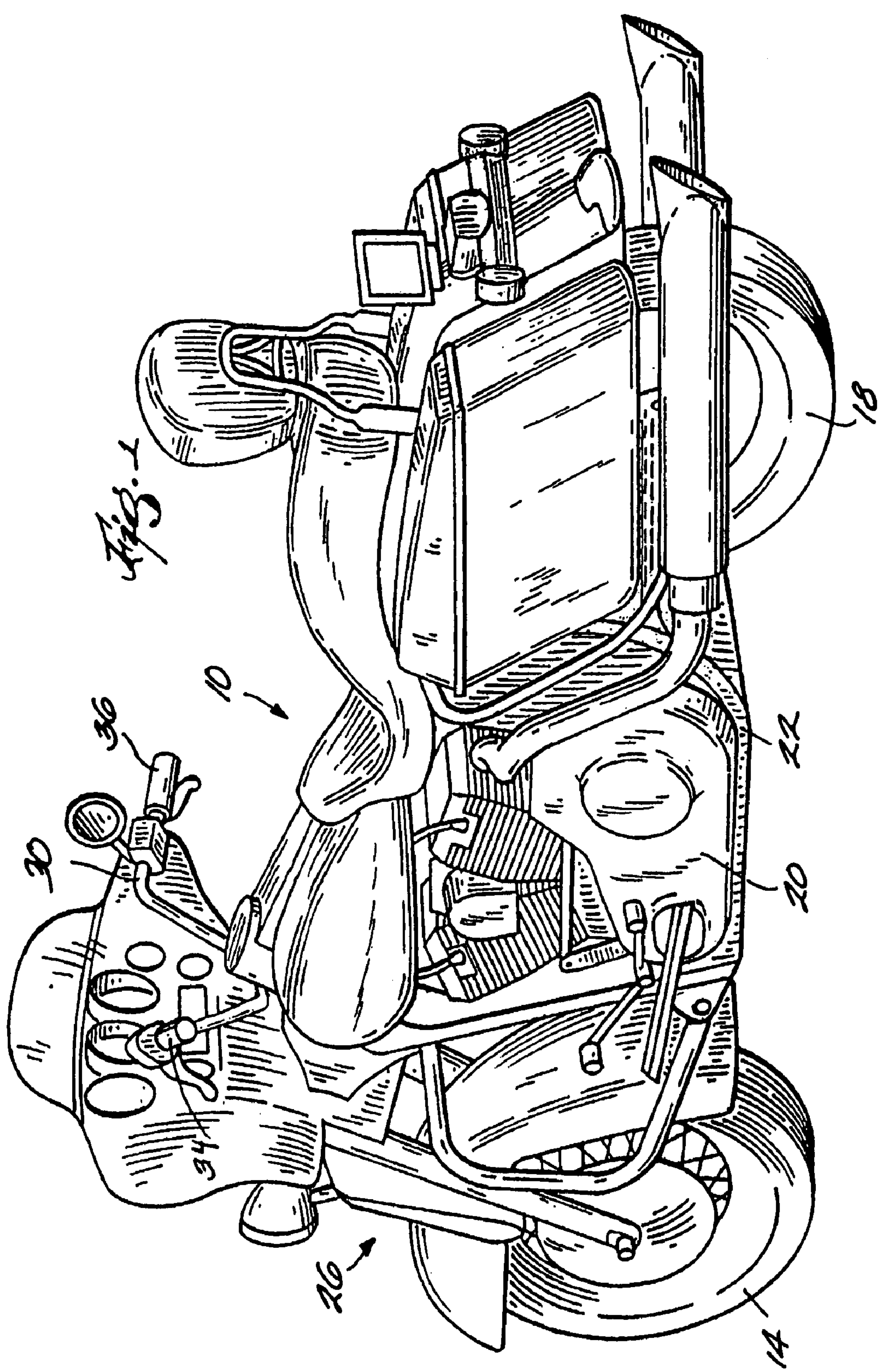
FIG. 1 is a perspective view of a motorcycle.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a motorcycle 10 including a front wheel 14, a rear wheel 18, an engine 20, and a frame 22 including a steering assembly 26 interconnecting the front and rear wheels 14, 18. The steering assembly 26 is pivotable about a steering axis and includes a handlebar 30 for imparting such pivotal motion to the steering assembly 26. The handlebar 30 includes first and second handlebar grips 34, 36 that are grasped by an operator for control of the motorcycle 10 during motorcycle operation.

Figures 2, 4:
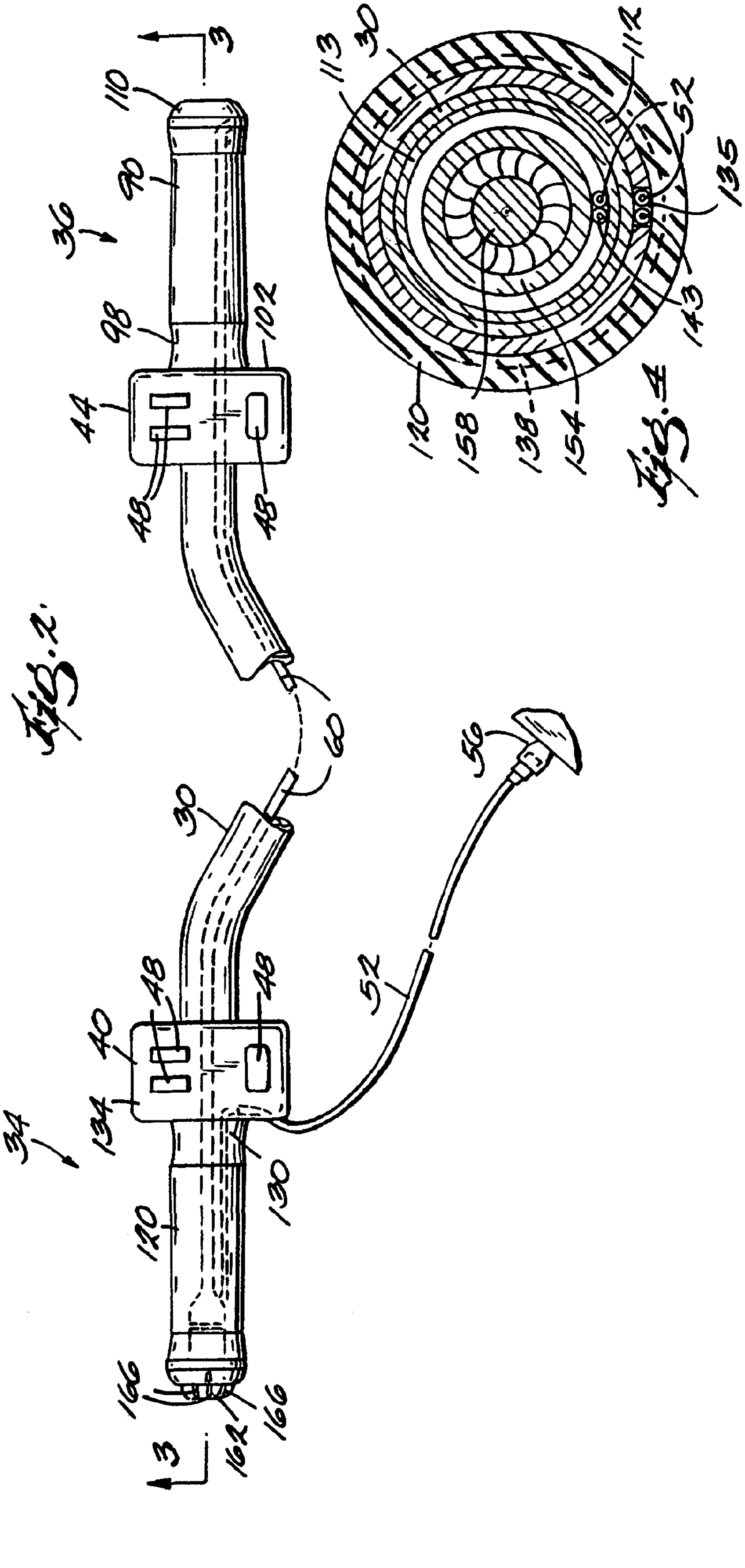
FIG. 2 is a rear view of the motorcycle handlebar including heated handgrips embodying the invention.
FIG. 4 is sectional view taken along line 4—4 of FIG. 3.

Referring now to FIG. 2, the first grip 34 is secured to the left-hand end portion of the handlebar 30, and the second grip 36 is secured to the right-hand end portion of the handlebar 30. A left control housing 40 is positioned inwardly of the first grip 34, and a right control housing 44 is positioned inwardly of the second grip 36. The control housings 40, 44 are secured to the motorcycle handlebar 30 in a known manner and also secure the grips 34, 36 to the handlebar 30 in a manner to be described further below. The left and right control housings 40, 44 include operator switches 48 that communicate with and control various devices on the motorcycle 10, such as the ignition, the starter, the turn signals, the horn, and other devices as is well known in the art. The illustrated handlebar 30 is a generally continuous tube that is typically made of a metal such as steel. However, it should be appreciated that other types of handlebars such as two-piece handlebars (e.g. "clip-ons") may also be used in accordance with the present invention.

The handlebar grips 34, 36 of the present invention are heatable by resistive heating elements embedded within the grips 34, 36. To accommodate such resistive heating, electrical power is provided to the grips 34, 36 by power wires 52 that extend from the left control housing 40 and are coupled to an auxiliary power port 56 provided on the motorcycle 10. The auxiliary power port 56 may comprise a power supply unit that is integral with the motorcycle 10, or may comprise additional wiring and circuitry that are coupled to the motorcycle wiring harness, and/or directly connected to the motorcycle battery. In the illustrated embodiment, the power wires 52 provide electrical power to the left grip 34, and jumper wires 60, which extend through the center of the handlebar 30 and are therefore hidden from view, provide electrical power to the right grip 36. Other embodiments of the invention may route the jumper wires 60 in a different manner, such as outside of the handlebar 30.

Figure 3:
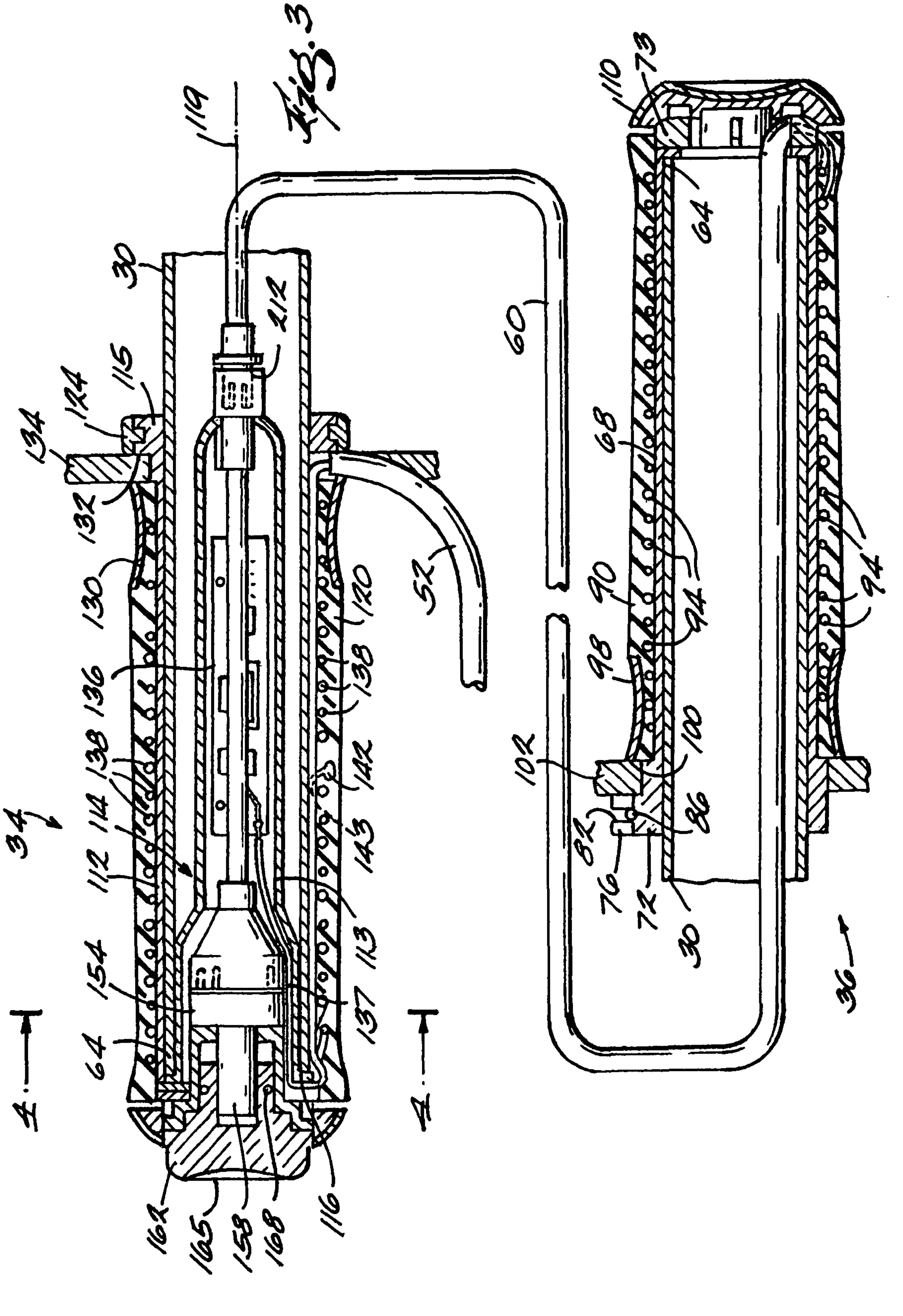
FIG. 3 is an enlarged section view taken along line 3—3 of FIG. 2.

With reference to FIG. 3, each grip 34, 36 receives an end 64 of the handlebar 30. As is known in the art, the right grip 36 is rotatably secured to the handlebar end 64 such that the right grip 36 can act as a motorcycle throttle control. The right grip 36 includes a generally cylindrical housing 68 having an inner end 72, an outer end 73, and an inner diameter that is slightly larger than the outer diameter of the handlebar 30. The inner end 72 of the housing 68 includes a circumferentially extending rib 76 that includes a radially recessed, circumferentially extending groove 82. The groove 82 receives a throttle cable 86 that is further coupled to the motorcycle throttle body (not shown). Rotation of the right grip 36 with respect to the handlebar 30 adjusts the throttle cable 86 to open and close the motorcycle throttle and subsequently change the speed of the engine 22. While the use of the right grip 36 as the motorcycle throttle control is well known in the art, it should be appreciated that the positions of the grips 34, 36 could be reversed, such that the throttle control is on the left.

Surrounding the housing 68 is a generally resilient grip sleeve 90. The sleeve 90 is preferably a resilient polymer that is injection molded around the housing 68. Embedded within the sleeve 90 and surrounding the housing 68 is a wire heating element 94 that is coupled to the jumper wires 60 adjacent to the end 64 of the handlebar 30. The heating element 94 is wrapped around the housing 68 from the outer end 73 to the inner end 72, and back to the outer end 73. Such a configuration allows for electrical coupling of the heating element 94 to the jumper wires 60 at a single end of the grip 36. Alternative embodiments of the invention may include alternatively configured heating elements, such as planar heating elements and the like. A substantially rigid circumferential ring 98 extends around the grip sleeve 90 near the inner end 72 of the housing 68 and cooperates with the circumferential rib 76 to provide a groove 100. The groove 100 receives a wall 102 of the control housing 44 to secure the grip 36 to the handlebar end 64. A removable end cap 110 is coupled to the outer end 73 of the housing 68 and substantially seals the inside of the grip 36 and the handlebar end 64.

The left grip 34 includes an outer grip housing 112 and an inner grip housing 113 that cooperate to define an annular space 114 that receives the end 64 of the handlebar 30. As such, the outer grip housing 112 surrounds the end 64 of the handlebar 30, while the inner grip housing 113 received by the generally cylindrical chamber defined by the end 64 of the handlebar 30. The left grip 34 is generally cylindrical and includes an inner end 115, an outer end 116, and defines a central axis 119. Similar to the right grip 36, the outer housing 112 is surrounded by a generally resilient grip sleeve 120 that is preferably molded around the outer housing 112. A radially outwardly extending circumferential rib 124 extends around the inner end 115 of the grip 34. The circumferential rib 124 cooperates with a substantially rigid circumferential ring 130 (similar to the ring 98) to provide a circumferentially extending groove 132 near the inner end 115. The groove 132 receives a wall 134 of the left control housing 40 to secure the grip 34 to the handlebar 30. Unlike the right grip 36, the left grip 34 is fixed against rotation with respect to the handlebar 30. While the rotatable connection of the right grip 36 to the handlebar 30 is generally conventional, the engagement of the groove 132 with the wall 134 of the control housing 40 in the left grip 34 eliminates the need to use adhesive to secure the grip 34 to the handlebar 30, thereby simplifying installation and/or removal of the grip 34.

Referring also to FIG. 4, the outer housing 112 defines a radially outwardly facing and axially extending channel 135 that extends from the inner end 115 of the outer housing 112 toward the outer end 116. The channel 135 receives the power wires 52, which extend along the channel 135 and around the end 64 of the handlebar 30. The power wires 52 further extend into the inner housing 113 where the power wires 52 are coupled to electronic control circuitry 136 that is operable to control the heating of the grips 34, 36. Substantially all of the electronic control circuitry 136 is positioned inside of the inner housing 113 and is therefore also positioned inside the handlebar 30. A wire heating element 138 is connected to the control circuitry 136 through wire 137 that extends from the inner housing 113 and around the end 64 of the handlebar 30. In the illustrated embodiment, the heating element 138 is wrapped around the outer housing 112 from the outer end 116 to the inner end 115, and back to the outer end 116. Such a configuration allows for electrical coupling of the heating element 138 at a single end of the grip 34.

To assist in regulating the heating of the grips, a temperature sensor in the form of a thermistor 142 is embedded in the left grip sleeve 120. The thermistor 142 is preferably embedded near a central portion of the left grip sleeve 120. A thermistor could also or alternatively be embedded in the right grip sleeve 90. The thermistor 142 communicates with the control circuitry 136 via thermistor wires 143 that extend from the inner housing 113, around the end 64 of the handlebar 30, and along the channel 135 to the central portion of the grip sleeve 120.

In addition to the thermistor 142, a heater control in the form of a variable resistor 154 is coupled to the outer end 116 of the grip 34 to assist in regulating the heating of the grips 34, 36. The variable resister 154 includes an extending shaft portion 158 that is rotatable with respect to the grip 34 to adjust the resistance of the variable resistor 154. The variable resistor 154 is generally adjustable between a range of resistance values, and may also include an OFF position, wherein the resistor 154 is substantially the same as an open switch and the resistance value is substantially infinite.

The shaft portion 158 is coupled to a heater control dial 162 that is positioned on the outer end 116 and is rotatable about the central axis 119. The dial 162 is rotatable by the motorcycle operator to adjust the resistance of the variable resistor 154, which in turn controls the heating of the grips 34, 36, as will be discussed further below. By positioning the dial 162 on the outer end 116 of the grip 34, temperature adjustments may be made without removal of the operator's hand from the grip 34.

Figure 6:
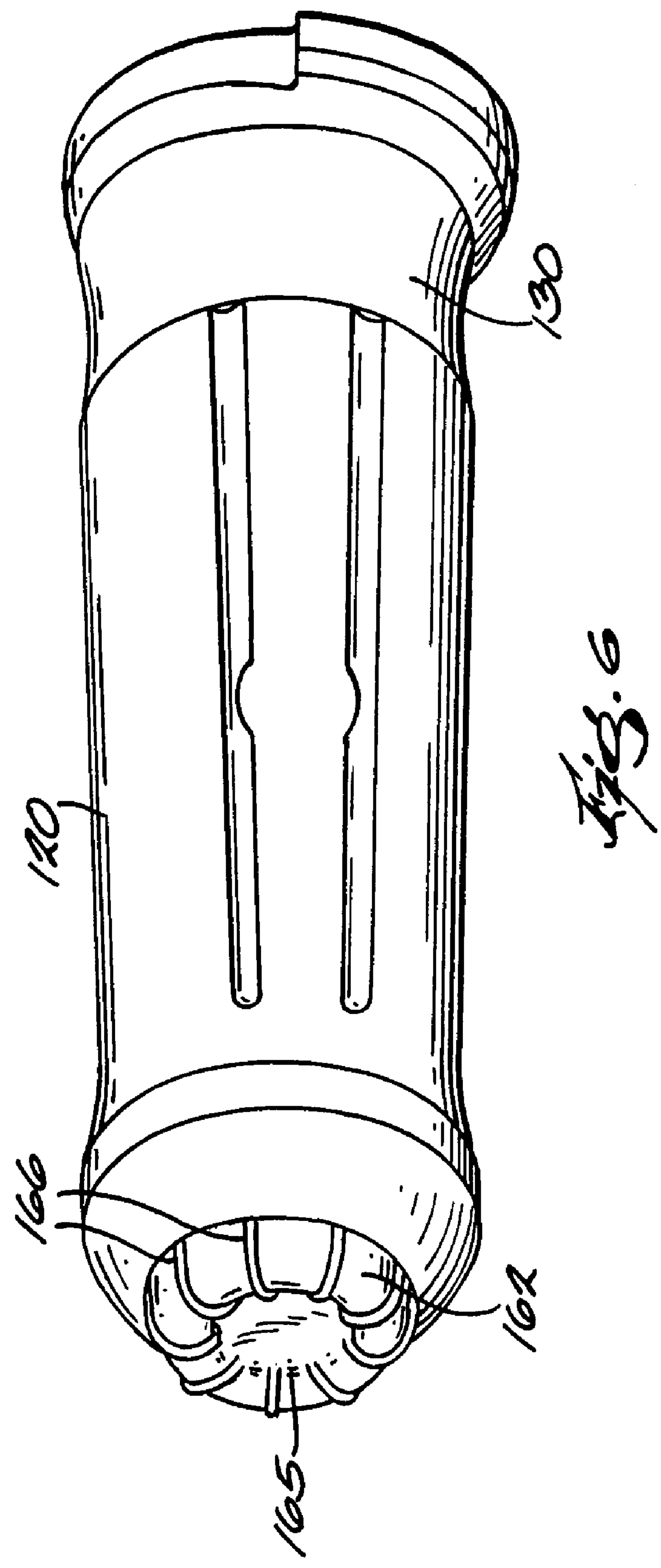
FIG. 6 is a perspective view of the left handgrip of FIG. 3.

The dial 162 has an outer diameter that is smaller than the outer diameter of the grip 34, thus reducing the likelihood that the dial 162 will unintentionally be rotated. In addition, the dial extends a distance beyond the end of the grip 34 and includes a plurality angularly spaced-apart ribs that define graduation marks 166 (sees FIGS. 2 and 6). The graduation marks 166 extend radially from a peripheral wall portion of the dial 162 and extend axially from an end wall portion of the dial 162. The graduation marks 166 indicate a relative angular position of the dial 162 with respect to the grip sleeve 120. The end of the dial 162 includes a concave portion 165, and the graduation marks 166 extend into the concave portion 165 such that the operator of the motorcycle can manipulate the dial 162 by placing and rotating a finger within the concave portion 165. The angular position of the dial 162, as established by the operator, substantially corresponds to a desired heat level of the grips 34, 36. The sizing and positioning of the dial 162, and the provision of raised graduation marks 166, facilitates easy operation of the dial 162 by the operator, particularly when the operator is wearing protective gloves. The assembly including the dial 162 and the variable resistor 154 can include a resilient O-ring 168 that substantially seals the inside of the grip 34 and the handlebar end 64.

When referring to the outer diameter of the dial, grip, or grip sleeve, it is intended to mean the general outer periphery of the dial, grip, or grip sleeve. For example, the outer periphery will actually be a diameter when the grip sleeve is tubular, however the outer periphery can take different shapes in the case where the grip sleeve is oblong or non-symmetrically-shaped.

Figure 5:
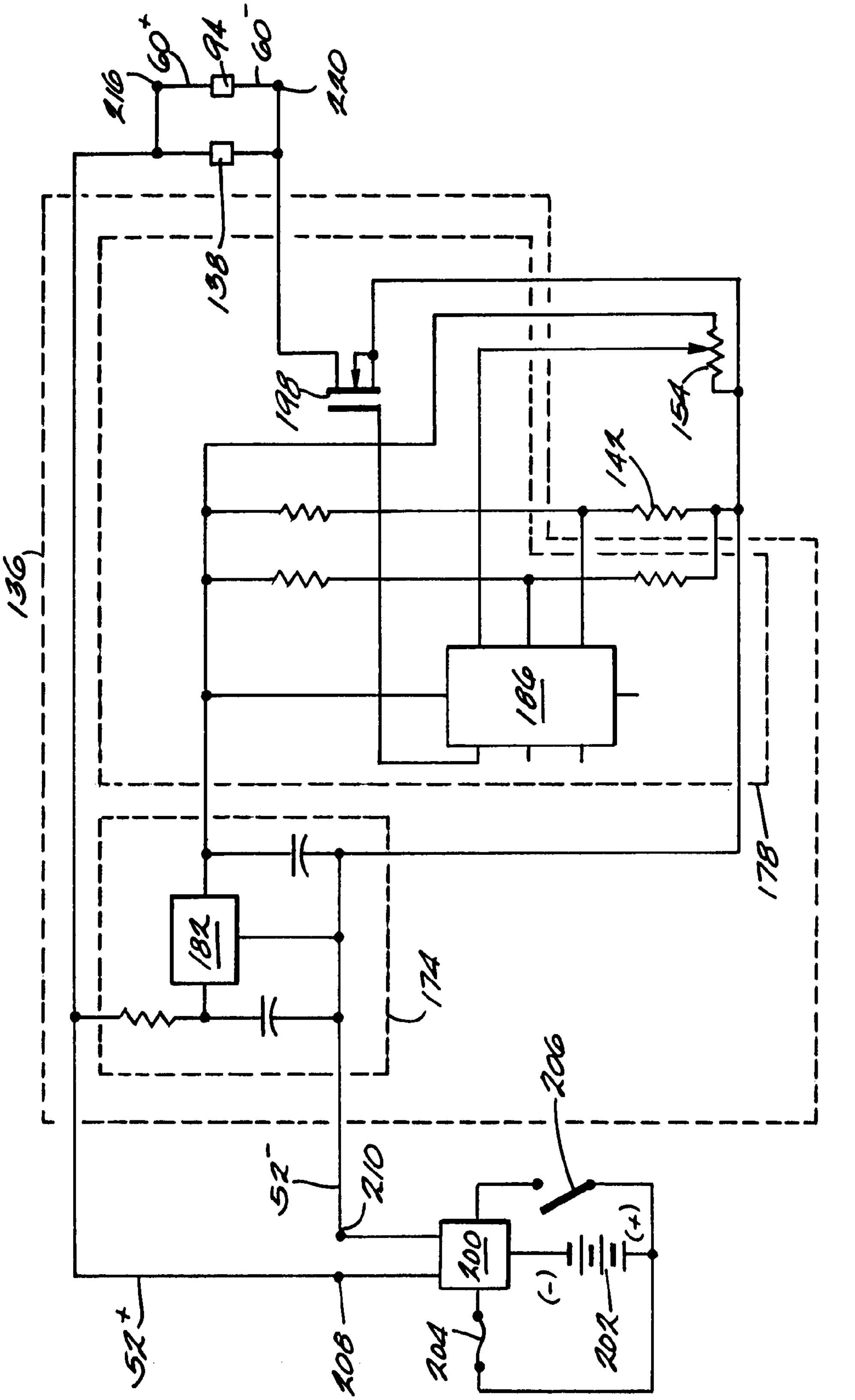
FIG. 5 is a schematic view of the electronic circuitry and control system for the heated handgrips.

As mentioned above, the inner housing 113 includes control circuitry 136 that controls the operation of the heating elements 94, 138 based on inputs produced by the variable resistor 154 and the thermistor 142. The control circuitry 136 is schematically shown in FIG. 5. The control circuit 136 includes a power supply circuit 174 and a temperature control circuit 178. The power supply circuit 174 includes a voltage regulator 182 and associated electrical components that provide filtering functions. In one embodiment, the voltage regulator 182 is National Semiconductor's LM78L05 three terminal positive regulator, and coverts a +12 volt signal into a +5 volt signal for use by the temperature control circuit 178.

The temperature control circuit 178 includes a programmable device 186, electrical components associated with the programmable device 186, and a switch 198. In one embodiment, the programmable device 186 is Microchip's PICT12C671 8-pin, 8-bit CMOS microcontroller with an A/D converter and an EEPROM data memory. The programmable device 186 receives a desired temperature input corresponding to the relative angular position of the dial 162 as established by the motorcycle operator, and an actual temperature input corresponding to the temperature sensed by the thermistor 142. The variable resistor 154 produces the desired temperature input, and a voltage divider formed by the thermistor 142 and the electrical components associated with the programmable device 186 produces the actual temperature input.

Based on the inputs, the programmable device 186 generates an output signal that controls operation of the parallel wired heating elements 94, 138. When the actual temperature input is less than the desired temperature input, the output signal closes the switch 198, thereby turning the heating elements 94, 138 ON. When the actual temperature is more than or equal to the desired temperature input, the output signal opens the switch 198, thereby turning the heating elements 94, 138 OFF. In one embodiment, the switch 198 is International Rectifier's IRL3102 power MOSFET.

The heat level of the heating elements 94, 138 is thus controlled in a first respect by the motorcycle operator adjusting the dial 162 to a desired angular position, thereby establishing the resistance of the variable resistor 154. The resistance of the variable resistor 154 produces the desired temperature input that is utilized by the control circuitry 136. In a second respect, the thermistor 142 senses the actual temperature of the grip sleeve 120 and establishes a resistance value corresponding to the sensed temperature. The resistance value of the thermistor 142 in combination with the resistance values of the electronics associated with the programmable device 186 produce the actual temperature input that is utilized by the control circuitry 136. The control circuitry 136 regulates the flow of electrical power through the heating elements 94, 138 in response to the inputs. The cooperative association of the variable resistor 154 and the thermistor 142 by way of the control circuitry 136 provides substantially constant grip 34, 36 temperatures regardless of the ambient temperature of the surroundings.

As mentioned above, the control circuitry 136 receives electrical power via the power wires 52. The power wires 52 are coupled to a relay 200, which in turn is coupled to the positive terminal (+) and the negative terminal (−) of a power source 202 (e.g., battery) of the motorcycle 10. The electrical conduit that connects the relay 200 to the positive terminal (+) preferably includes an in-line fuse 204. The relay 200 is also electrically coupled to a switch 206 (e.g., the motorcycle ignition) that signals the relay 200 to turn ON and OFF. When the relay 200 turns ON, power is transmitted via the power wires 52 to the control circuitry 136 and the heating elements 94, 138 are turned ON and OFF as described above. The power wires 52 are coupled to the relay 200 at positive node 208, and ground node 210. The nodes 208, 210 substantially correspond to the electrical connector that couples the power wires 52 to the auxiliary power port 56 (see FIG. 2). The power wires 52 include a first power wire 52+ that transmits a +12 volt signal, and a second power wire 52− that transmits a ground signal. When the relay 200 turns OFF, power is no longer transmitted via the power wires 52 to the control circuitry 136 and the heating elements 94, 138 remain OFF.

As is illustrated in FIG. 3, the jumper wires 60 extend from the right grip 36, through the handlebar 30, and are coupled to the inner housing 113 at a socket connector 212. The socket connector 212 is schematically represented in FIG. 5 by nodes 216 and 220. Similar to the power wires 52, the jumper wires 60 include a first jumper wire 60+ that transmits a +12 volt signal, and a second jumper wire 60− that transmits a ground signal.

The control circuitry 136 and the other electrical components (e.g., the power relay 200, the fuse 204, the switch 206, the power source 202, the jumper wires 60, the power supply circuit 174, the temperature control circuit 178, the switch 198, the variable resistor 154, the thermistor 142, and the heating elements 94, 138) described above represent one embodiment of the electronic circuitry and control system for use with the grips 34, 36. Other embodiments of the electronic circuitry and control system for use with the grips 34, 36 may be alternatively configured and/or constructed.

In operation, the grips 34, 36 are turned ON by closing the switch 206 and/or adjusting the dial 162 such that the variable resistor 154 is in a non-OFF position. With electrical power flowing to the control circuitry 136 via the power wires 52, the controller 186 receives and compares the resistance input values provided by the thermistor 142 and the variable resistor 154, and adjusts the switch 198 accordingly to turn the heating elements 94, 138 ON and OFF as described above. As the grips 34, 36 reach elevated temperatures, the motorcycle operator may further adjust the grip temperature by rotating the dial 162. Because the dial 162 is positioned on the outer end 116 of the grip 34, the motorcycle operator can adjust the grip temperature without having to remove his/her hand from the left grip 34.

What is claimed is:

1. A heated handgrip assembly adapted to be secured to a vehicle handlebar, the heated handgrip comprising:

a grip having a first end adapted to receive the handlebar, a second end opposite the first end, a grip sleeve extending between the first and second ends, and a heating element operable to provide a heat output, the grip sleeve defining a first outer diameter; and a dial extending from the second end to control the heat output of the heating element, the dial having a second outer diameter smaller than the first outer diameter.

2. The heated handgrip assembly of claim 1, wherein the second outer diameter is less than 80% of the first outer diameter.

3. The heated handgrip assembly of claim 1, wherein the second outer diameter is approximately 70% of the first outer diameter.

4. The heated handgrip assembly of claim 1, wherein the dial includes angularly-spaced ribs.

5. The heated handgrip assembly of claim 4, wherein the ribs are equally angularly-spaced.

6. The heated handgrip assembly of claim 4, wherein the dial is operable to vary the level of the heat output, and wherein the ribs define graduation marks that indicate the level of the heat output.

7. The heated handgrip assembly of claim 4, wherein the dial includes a peripheral wall portion and an end wall portion, wherein the ribs extend radially outward from the peripheral wall portion and extend axially from the end wall portion.

8. The heated handgrip assembly of claim 7, wherein the end wall portion is concave.

9. The heated handgrip assembly of claim 1, wherein the grip includes a central axis, and wherein the dial is rotatable about the central axis.

10. A heated handgrip assembly adapted to be secured to a vehicle handlebar, the heated handgrip comprising:

a grip housing having a first end adapted to receive the handlebar, a second end opposite the first end, a grip sleeve extending between the first and second ends, and a heating element operable to provide a heat output; and a dial extending from the second end to control the heat output of the heating element, wherein the dial includes a rib.

11. The heated handgrip assembly of claim 10, wherein the grip sleeve defines a first outer diameter, and wherein the dial includes a second outer diameter smaller than the first outer diameter.

12. The heated handgrip assembly of claim 10, wherein the dial includes a plurality of ribs that are angularly-spaced.

13. The heated motorcycle handgrip of claim 12, wherein the dial is operable to vary the level of the heat output, and wherein the ribs define graduation marks that indicate the level of the heat output.

14. The heated handgrip assembly of claim 12, wherein the dial includes a peripheral wall portion and an end wall portion, wherein the ribs extend radially outward from the peripheral wall portion and extend axially from the end wall portion.

15. The heated handgrip assembly of claim 14, wherein the end wall portion is concave.

16. The heated handgrip assembly of claim 10, wherein the housing includes a central axis, and wherein the dial is rotatable about the central axis.

* * * * *